(12) United States Patent
Smith et al.

(10) Patent No.: US 7,890,124 B2
(45) Date of Patent: Feb. 15, 2011

(54) LOCATION BASED INFORMATION DELIVERY

(75) Inventors: William L. Smith, Marietta, GA (US); Steven Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 598 days.

(21) Appl. No.: 11/536,266

(22) Filed: Sep. 28, 2006

(65) Prior Publication Data

US 2008/0194272 A1 Aug. 14, 2008

(51) Int. Cl.
*H04W 24/00* (2009.01)

(52) U.S. Cl. ............... 455/456.3; 455/414.1; 455/456.2; 455/456.1; 705/10; 705/25

(58) Field of Classification Search .............. 455/456.3, 455/414.1, 456.2, 456.1; 705/10, 25
See application file for complete search history.

(56) References Cited

U.S. PATENT DOCUMENTS

| | | | |
|---|---|---|---|
| 6,266,525 B1* | 7/2001 | Peterson | 455/410 |
| 6,414,635 B1* | 7/2002 | Stewart et al. | 342/457 |
| 6,650,902 B1* | 11/2003 | Richton | 455/456.3 |
| 7,336,964 B2* | 2/2008 | Casey | 455/456.3 |
| 2002/0038386 A1 | 3/2002 | Bhatia et al. | |
| 2002/0046084 A1* | 4/2002 | Steele et al. | 705/14 |
| 2002/0077130 A1 | 6/2002 | Owensby | |
| 2002/0095333 A1 | 7/2002 | Jokinen et al. | |
| 2002/0111154 A1 | 8/2002 | Eldering et al. | |
| 2002/0176579 A1 | 11/2002 | Deshpande et al. | |
| 2003/0023482 A1 | 1/2003 | Messner et al. | |
| 2003/0222134 A1 | 12/2003 | Boyd | |
| 2005/0038876 A1* | 2/2005 | Chaudhuri | 709/219 |
| 2005/0043060 A1 | 2/2005 | Brandenberg et al. | |
| 2005/0187823 A1* | 8/2005 | Howes | 705/14 |
| 2005/0188062 A1* | 8/2005 | Li et al. | 709/220 |
| 2006/0176289 A1 | 8/2006 | Horn | |
| 2007/0061245 A1* | 3/2007 | Ramer et al. | 705/37 |
| 2008/0037723 A1 | 2/2008 | Milstein et al. | |

OTHER PUBLICATIONS

U.S. Appl. No. 11/504,912, filed Aug. 16, 2006 entitled, "Methods and Computer-Readable Media for Location-Based Targeted Advertising" Inventors: S. Sherman & D. O'Neil.
U.S. Official Action dated Dec. 4, 2009 in U.S. Appl. No. 11/504,912.
U.S. Official Action dated Jul. 7, 2010 in U.S. Appl. No. 11/504,912.
U.S. Official Action dated May 14, 2009 in U.S. Appl. No. 11/504,912.

* cited by examiner

*Primary Examiner*—Kamran Afshar
*Assistant Examiner*—Khalid Shaheed
(74) *Attorney, Agent, or Firm*—Hope Baldauff Hartman, LLC

(57) ABSTRACT

Methods, systems, and computer-readable media are provided for location-based information delivery. One system described herein includes a matching server operative to identify a geographic area in which an informational message should be transmitted to subscriber devices located within the area. The geographic area may be a statically defined fixed geographic area, such as a neighborhood, that the matching server identifies utilizing one or more fixed geographic indicators. The geographic area identified by the matching server may alternatively be an ad-hoc variably sized geographic area. The matching server may utilize one or more variable geographic indicators to identify the geographic area. Once a geographic area has been identified, the matching server is operative to transmit an informational message to subscriber devices located within the geographic area. The informational message may contain content relevant to the geographic area.

23 Claims, 8 Drawing Sheets

LOCATION BASED INFORMATION DELIVERY

CROSS-REFERENCE TO RELATED APPLICATIONS

This application is related to co-pending U.S. patent application Ser. No. 11/504,912, which was filed on Aug. 16, 2006 and entitled "METHODS AND COMPUTER-READABLE MEDIA FOR LOCATION-BASED TARGETED ADVERTISING," and which is expressly incorporated herein by reference in its entirety.

TECHNICAL FIELD

This application relates generally to the field of information delivery. More specifically, the disclosure provided herein relates to the field of location-based information delivery.

BACKGROUND

It is often desirable to deliver targeted information to select individuals located in a discrete geographic area. For instance, it may be desirable to deliver community related information only to individuals residing within a particular neighborhood. Likewise, it may be desirable to deliver event-related information only to individuals at a particular event. In a similar vein, it may be desirable to deliver advertising information for a business only to potential customers who are located proximately to the business.

Although highly desirable, delivering targeted information to select individuals in a discrete geographic area in the manner described above is very difficult for at least several reasons. In the context of delivering information to individuals in a fixed geographic area such as a neighborhood, it is often difficult to determine the actual bounds of the neighborhood. Traditional geographical descriptors, such as ZIP codes and city names, often span multiple neighborhoods. Even if the bounds of the neighborhood can be identified, the actual recipients of the information that are physically located within the neighborhood must also be identified. This too can be a challenging process.

In the context of delivering information to individuals in a geographic area that varies in size and duration, such as individuals located at an event, it is highly difficult to determine both the geographic area itself and the duration of the event. For instance, several thousand people may be present at an event only for several hours. While at the event, information provided to the attendees regarding the event, such as advertising regarding specials offered during the event, may be of great value to the attendees. However, once the event has concluded and the event attendees are no longer at the location of the event, the information is of little or no value.

SUMMARY

According to aspects of the disclosure presented herein, methods, systems, and computer-readable media are provided for location-based information delivery. According to one method provided herein, media content is received for insertion into a media stream. The media content may include audio for insertion into an audio media stream, video for insertion into a video media stream, or other type of media content for insertion into another type of media stream. The media content includes a geographic descriptor identifying a geographic area in which the media content should be provided to subscriber devices. In one implementation, the media content relates to the geographic area identified in the geographic descriptor. For instance, the media content may be advertising content for a business operating within the geographic area identified in the geographic descriptor.

According to other aspects of the method, geographic information corresponding to a subscriber device is received. The geographic information may identify the general or particular location of a fixed location subscriber device, such as a set-top box or other type of video display device. The geographic descriptor for the media content is compared to the geographic information corresponding to the subscriber device. Based upon the results of the comparison, a determination is made as to whether the media content should be provided to the subscriber device. If the media content should be provided to the subscriber device, the media content is inserted into the media stream and the media stream is delivered to the subscriber device over an appropriate communications network. The subscriber device is operative to render the received media stream.

According to other aspects described herein, a system is provided for location-based information delivery that identifies a geographic area in which an informational message should be transmitted to subscriber devices located within the area. The geographic area may be a statically defined fixed geographic area, such as a neighborhood, that the system identifies utilizing one or more fixed geographic indicators. For instance, fixed geographic indicators such as community demarcations, government data, census data, school districts, the location of one or more fixed location subscriber devices, and others may be utilized by the system to determine the bounds of the geographic area.

According to other aspects, the geographic area identified by the system may be an ad-hoc variably sized geographic area. The system may utilize one or more variable geographic indicators, such as the mobile location of subscriber devices, the calling patterns of subscriber devices, and others to identify the geographic area. Utilizing such variable geographic indicators, the system identifies geographic areas that have a potentially changing size and duration, such as the geographic boundaries of an event.

Once a geographic area has been identified, the system transmits an informational message to subscriber devices located within the geographic area. As an example, the system may transmit a short message service ("SMS") message to subscriber devices located within the geographic area. In one implementation, the informational message contains content relevant to the geographic area. For instance, the content of the informational message may be related to a neighborhood within the geographic area or an event occurring within the geographic area.

According to other aspects of the disclosure presented herein, a method is provided for location-based information delivery. According to one method described herein, an informational message is defined and stored. The informational message may include content relevant to a particular geographic area. A geographic area in which the informational message should be delivered may also be defined and stored with the informational message. Once the informational message has been defined and stored, a geographic area in which the message should be delivered is identified.

The geographic area may be identified based on fixed geographic indicators, variable geographic indicators, or both. Fixed geographic indicators include data identifying a fixed geographic area, such as the geographic area defined with the informational message, community demarcations, ZIP codes, government data, census data, school districts, the location of one or more fixed location subscriber devices, and others. Variable geographic indicators include data identifying a geographic area that has variable boundaries, such as the location of one or more mobile subscriber devices.

Once the geographic area has been identified, the subscriber devices to which the informational message should be transmitted are identified. In particular, according to one implementation, a group of potential subscriber devices to which the message may be transmitted are identified by determining the subscriber devices located within or proximate to the geographic area. Once the potential subscriber devices have been identified, the actual subscriber devices to which the message should be transmitted are identified. The actual subscriber devices may be identified based upon a calling pattern associated with a subscriber device, a profile associated with the subscriber device indicating a willingness to receive such messages, or other factors.

Once the actual subscriber devices to which the message should be transmitted have been identified, the informational message is transmitted to the identified subscriber devices. Alternatively, a user interface may be provided through which a subscriber device may request the message. In response to such a request, the informational message is provided to the subscriber device.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
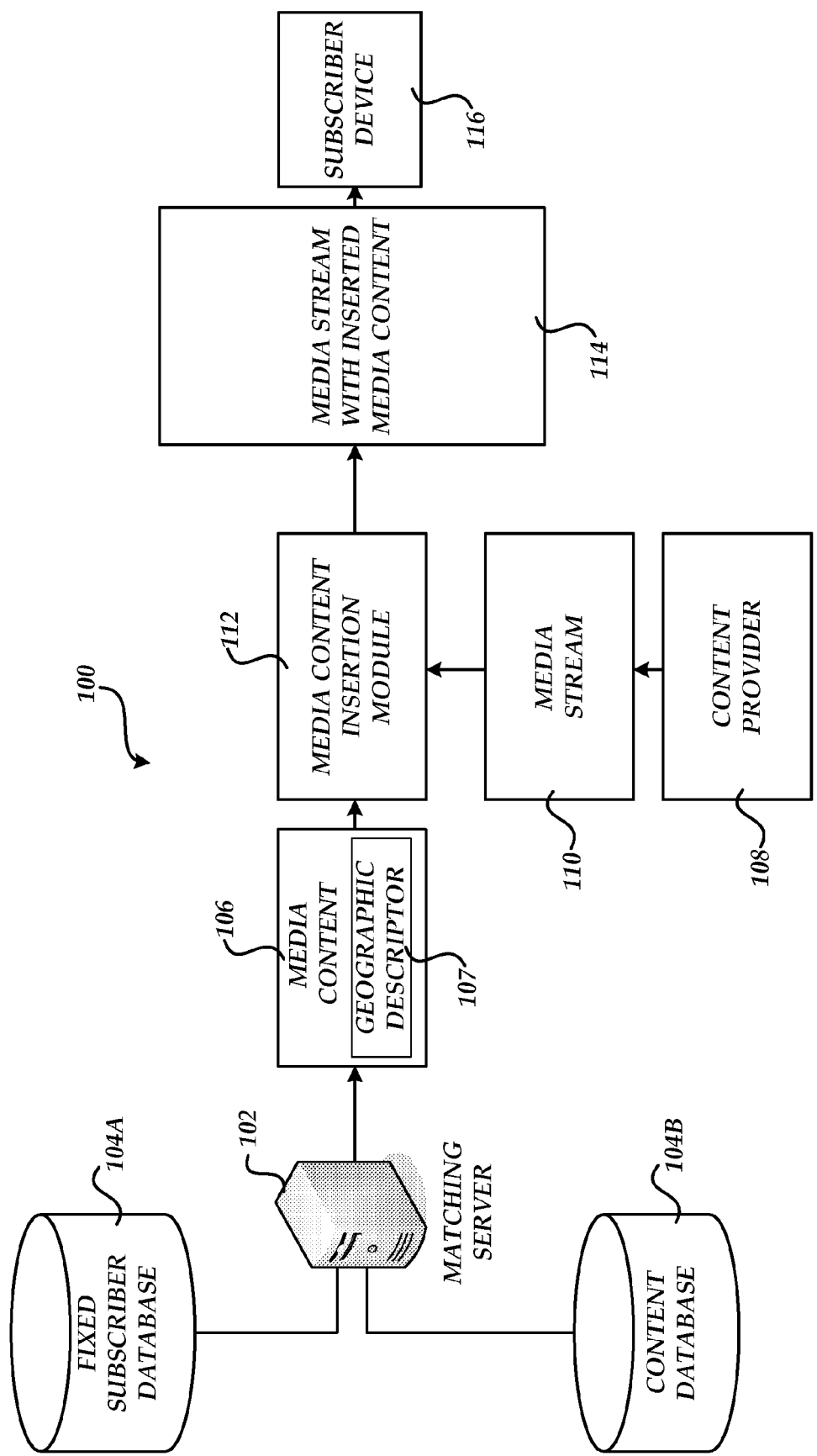
FIG. 1 is a system diagram showing aspects of one embodiment described herein for inserting advertising content into a media stream and providing the content to a fixed location subscriber device based upon geographic location.

The following detailed description is directed to methods, systems, and computer-readable media for location-based information delivery. In the following detailed description, references are made to the accompanying drawings that form a part hereof, and which are shown by way of illustration specific embodiments or examples. Referring now to the drawings, in which like numerals represent like elements through the several figures, aspects of the apparatus and methods provided herein will be described.

FIG. 1 is a system diagram showing aspects of one embodiment described herein for inserting media content into a media stream, and for providing the modified stream to a fixed location subscriber device based upon the geographic location of the device. The system 100 illustrated in FIG. 1 includes a matching server 102. In one implementation, the matching server 102 comprises a computer server operative to coordinate the process of selecting and inserting media content 106 into a media stream 110 based upon the geographic location of a subscriber device 116. The media stream 110 may be provided by a content provider 108, by the operator of the matching server 102, or by another entity. To perform these tasks, the matching server 102 may utilize the contents of a fixed subscriber database 104A. The fixed subscriber database 104A contains detailed geographic information that identifies the geographic location of subscriber premises connected to the wire line portion of a communications network. Utilizing this information, the matching server 102 can determine the specific geographic location of a fixed location subscriber device 116 located at the subscriber premises. The fixed location subscriber device 116 may comprise a set top box, or other type of fixed location device capable of receiving and rendering a media stream. Additional details regarding the contents of the fixed subscriber database 104A are provided below.

In one implementation, the matching server 102 also utilizes a content database 104B. The content database 104B includes the media content 106 that is configured for insertion into the media stream 110. According to implementations, the media content 106 comprises video content and the media stream 110 comprises a video stream. Alternatively, the media content 106 may comprise audio content and the media stream 110 may comprise an audio stream. The media content 106 may also comprise other types of data formatted for insertion into a suitable media stream 110, such as text information, static graphics, subtitle data, and other types of information. In implementations wherein the media stream 110 comprises a video stream, the media content 106 may also comprise a sub-component of the video stream. For example, utilizing the MPEG-4 standard, sub-components of a rich media stream may be defined and inserted into specified slots within the media stream. Additional details regarding the contents of the content database 104B are provided below.

According to other aspects of one implementation, the media content 106 includes a geographic descriptor 107. The geographic descriptor 107 identifies a geographic area in which the media content 106 should be provided to subscriber devices. For example, a business operating in a particular geographic area may provide media content 106 that includes an advertisement for the business. A geographic descriptor 107 would be defined by the business for the media content 106 that indicates the boundaries of the geographic region in which the media content 106 should be inserted into the media stream 110 and provided to subscriber devices. In this manner, the geographic area in which the advertisement is provided may be limited in the manner desired by the business.

Figure 3:
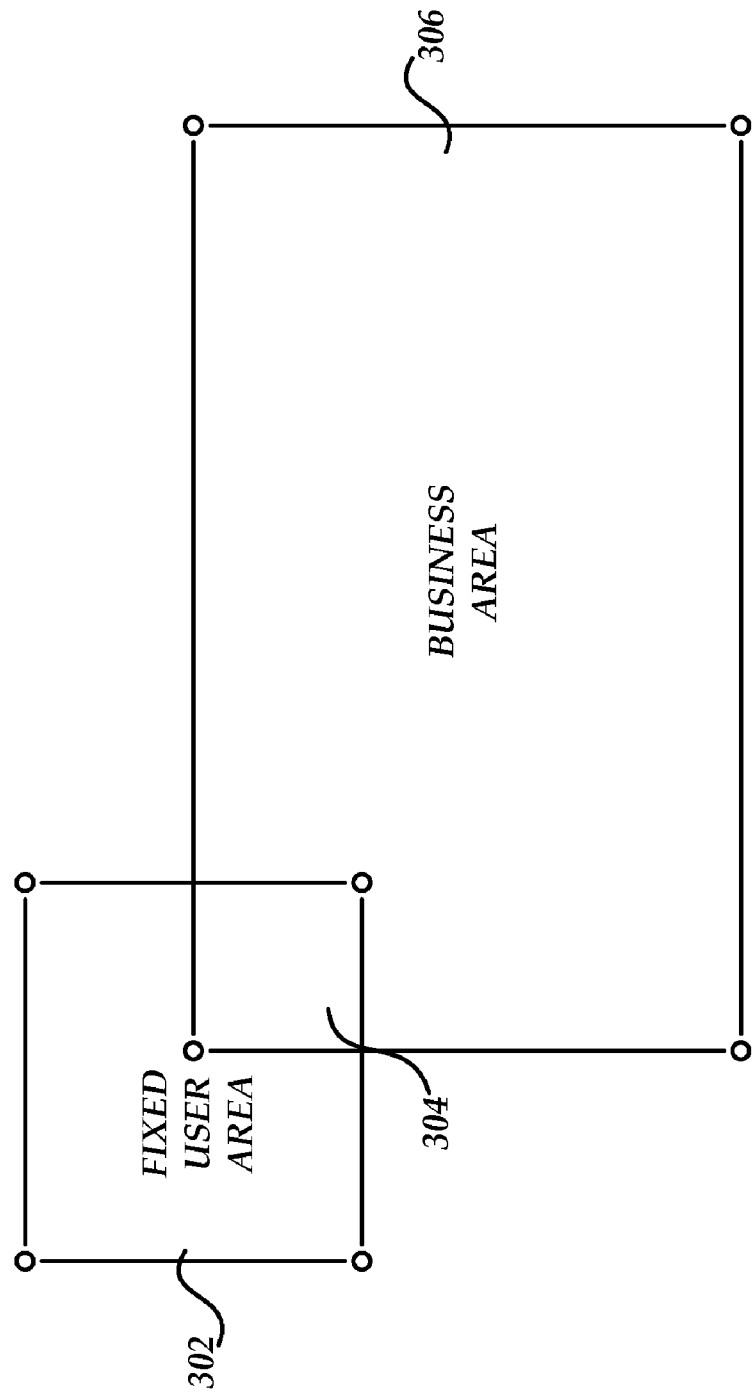
FIG. 3 is a map diagram illustrating aspects of a method for determining the geographic area in which customized media content should be provided in one embodiment described herein.

In order to provide the media content 106 to the appropriate subscriber devices, the matching server 102 compares the geographic descriptor 107 for the media content 106 to the geographic information for the subscriber device 116 stored in the database 104A. Based upon the results of the comparison, the matching server 102 determines whether the media content 106 should be provided to the subscriber device 116. In particular, if the subscriber device 116 is located within the region specified by the geographic descriptor 107, then the media content 106 should be provided to the subscriber device 116. As an example, FIG. 3 illustrates a fixed user area 302 that is defined by the geographic information for the subscriber device 116 stored in the database 104A. The business area 306 is defined by the geographic descriptor 107 for the media content 106. If the matching server 102 determines that there is an overlapping area 304 between the fixed user area 302 and the business area 306, then the matching server 102 will conclude that the media content 106 should be provided to the fixed location subscriber device.

In order to provide the media content 106 to the subscriber device 116, the matching server 102 utilizes an insertion module 112. The insertion module 112 causes the media content 106 to be inserted into the media stream 110. The media stream with inserted media content 114 is then delivered to the subscriber device 116 over an appropriate wired communications network. The subscriber device 116 is operative to receive and render the media stream with inserted media content 114. Additional details regarding this process are provided below with respect to FIG. 2.

Figure 2:
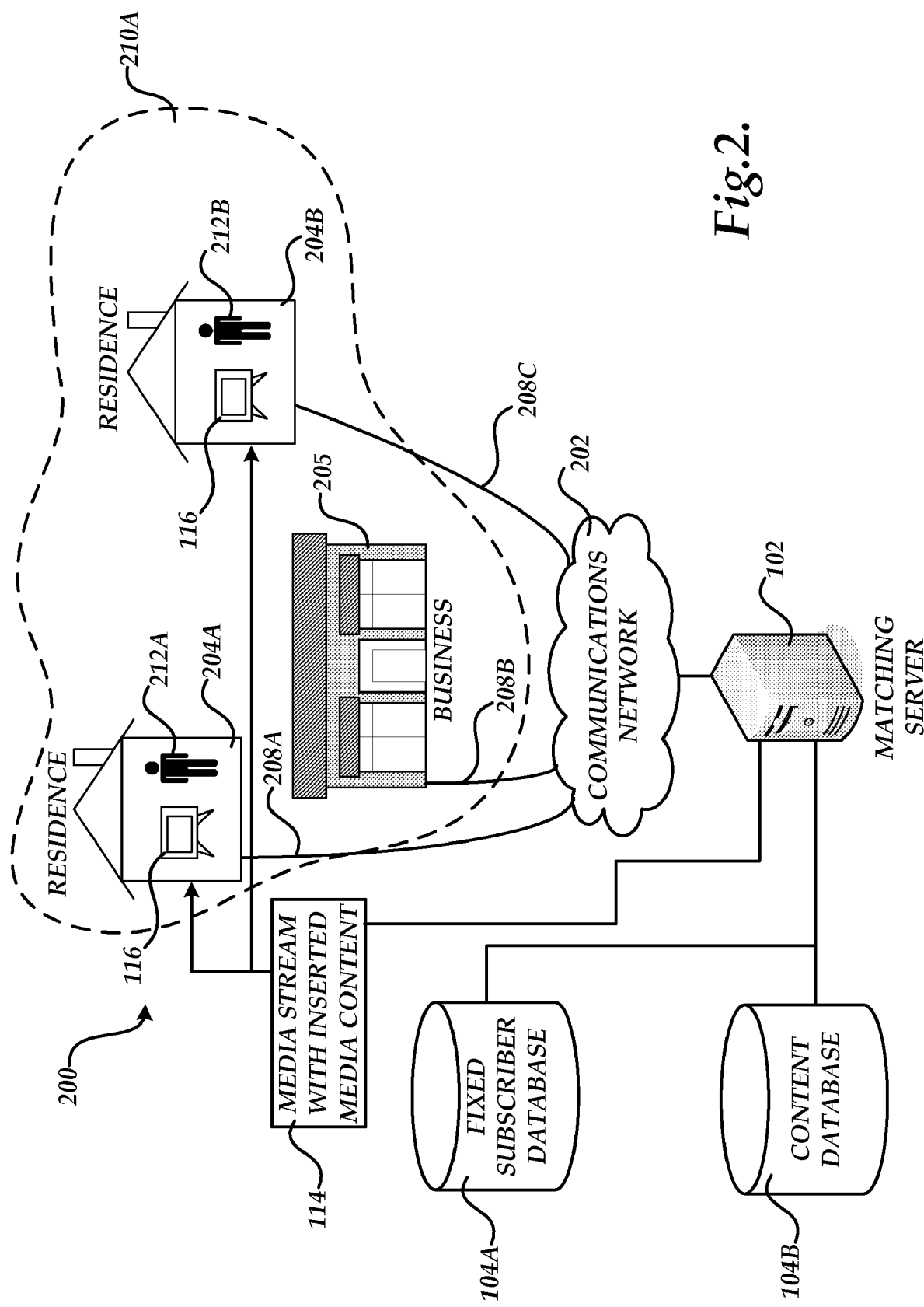
FIG. 2 is a network diagram showing one illustrative operating environment for an embodiment described herein for providing customized media content to a fixed location subscriber device.

FIG. 2 is a network diagram showing one illustrative operating environment for an embodiment described herein for providing customized content to a fixed location subscriber device based on the geographic location of the device. As shown in FIG. 2, a network 200 is utilized that includes the matching server 102, which is connected to a communications network 202. The communications network 202 includes wire line networking capabilities. In particular, the communications network 202 may include aspects of a traditional plain old telephone service ("POTS") wire line network, such as the wired subscriber lines 208A and 208B. Other examples of the lines 208A and 208B include cable or optical fiber lines. These lines 208A and 208B may be used in a Public Switched Telephone Network ("PSTN"), a cable network, or a packetized network. The subscriber lines 208A and 208B may be utilized for voice and data communications utilizing either analog or digital transmission methods.

Subscriber devices compatible with a wire line network may be located by subscribers at fixed locations, such as by the subscribers 212A and 212B at the residences 204A and 204B, respectively. It should be appreciated that the wire line network may include fiber optic cabling, co-axial cabling, or other types of cabling suitable for connecting devices at fixed locations. Fixed location wire line subscriber devices may include analog or digital telephones, computer systems, set-top boxes, and other types of devices capable of sending or receiving analog or digital communications on a wire line network. It should also be appreciated that although the communications network 202 has been illustrated in FIG. 2 as a single network, the network 202 may comprise a combination of various separate wire line networks.

In the implementation illustrated in FIG. 2, the matching server 102 comprises a computing system that operates in conjunction with the communications network 202 to assist with the location-based delivery of information to subscriber devices connected to the network 202. As discussed briefly above, the matching server 102 identifies a geographic area in which the media content 106 should be transmitted to one or more fixed location subscriber devices 116. In one implementation, the media content 106 is related to the geographic area in which it is transmitted. In this embodiment, the geographic area is a statically defined fixed geographic area, such as a neighborhood, city, state, ZIP code, or school district. For example, as shown in FIG. 2, a geographic area 210A has been defined that includes one or more residences 204A and 204B, and a business 205. As mentioned above, the geographic area 210A is defined by the geographic descriptor 107 associated with the media content 106. This data may be stored in one or more databases accessible to the matching server 102, such as the fixed subscriber database 104A.

As discussed briefly above with respect to FIG. 1, the matching server 102 is operative to compare the geographic descriptor 107 for the media content 106 to the geographic information for the subscriber devices 116 stored in the database 104A. Based upon the results of the comparison, the matching server 102 determines whether the media content 106 should be provided to the subscriber devices 116. In particular, if the subscriber devices 116 are located within the geographic area 210A specified by the geographic descriptor 107, then the media content 106 should be provided to the subscriber devices 116.

If the matching server 102 determines that the media content 106 should be provided to one or more of the subscriber devices 116, the matching server 102 utilizes an insertion module 112 to cause the media content 106 to be inserted into the media stream 110. The media stream with inserted media content 114 is then delivered to the subscriber devices 116 over the communications network 202. The subscriber devices 116 are operative to receive and render the media stream with inserted media content 114.

In the example illustrated in FIG. 2, the business 205 has specified a geographic descriptor 107 for the media content 106 that defines the boundaries of the area 210A. Based upon the contents of the fixed subscriber database 104A, the matching server 102 can determine that the subscriber devices located at the residences 204A and 204B are within the area 210A. Accordingly, in response to such a determination, the matching server 102 is operative to insert the media content 106 into the media stream 110 to create the media stream with inserted media content 114. The media stream 114 is then delivered to the fixed location subscriber devices 116 located at the residences 204A and 204B.

It should be appreciated that although the matching server 102 is illustrated in FIG. 2 as a single structure, such as a single specialized computer, the matching server 102 may actually comprise a multitude of computing systems located at the same location or at different locations connected to one another by a suitable computing network. It should also be appreciated that although the databases 104A and 104B are illustrated in FIG. 2 as being connected directly to the matching server 102, the databases 104A and 104B may be located at remote network locations and may be maintained by other computing systems that are accessible to the matching server 102.

Figure 4:
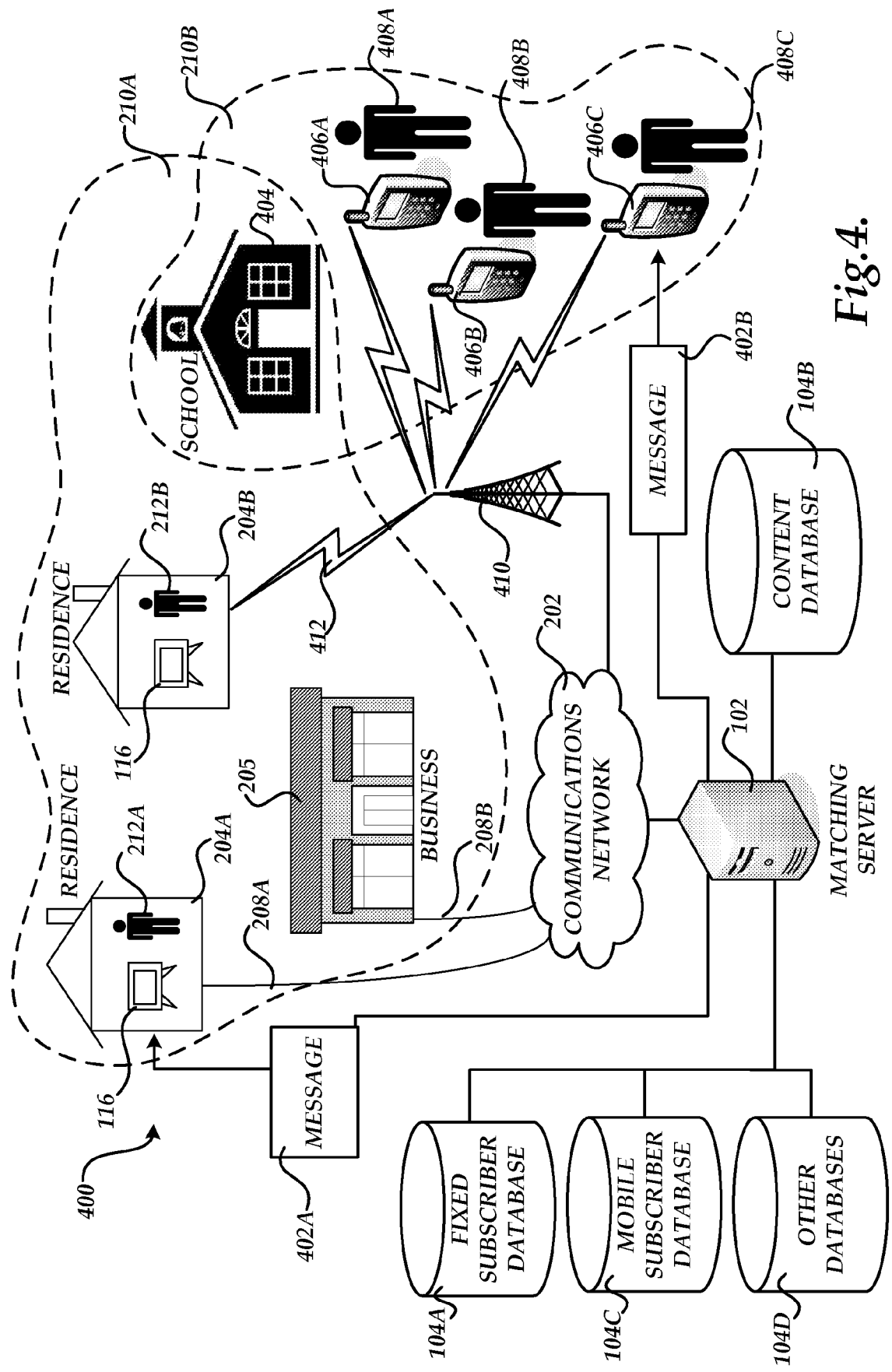
FIG. 4 is network diagram showing an illustrative operating environment for another embodiment described herein along with aspects of a system described herein that provides location-based information delivery.

FIG. 4 shows an illustrative operating environment for another implementation of the disclosure presented herein. As shown in FIG. 4, the network 400 includes a matching server 102 connected to a communications network 202. The communications network 202 includes both wire line and wireless networking capabilities. In particular, the communications network 202 may include aspects of a POTS wire line network, such as the wired subscriber lines 208A and 208B. Other examples of the lines 208A and 208B include cable or optical fiber lines. These lines 208A and 208B may be used in a PSTN, a cable network, or a packetized network. The subscriber lines 208A and 208B may be utilized for voice and data communications utilizing either analog or digital transmission methods. Subscriber devices 116 compatible with a wire line network may be located at fixed locations, such as residence 204A and business 205. It should be appreciated that the wire line network may include fiber optic cabling, co-axial cabling, or other types of cabling suitable for connecting devices at fixed locations. Fixed location wire line subscriber devices may include analog or digital telephones, computer systems, set-top boxes, and other types of devices capable of sending or receiving analog or digital communications on a wire line network. Fixed location wireless devices may also be utilized.

As illustrated in FIG. 4 and briefly described above, the communications network 202 also includes wireless networking capabilities. In particular, the communications network 202 may also include a wireless network capable of delivering voice and data to wireless mobile subscriber devices. Examples of such systems include General Packet Radio Service ("GPRS") networks, Global System for Mobile Communications ("GSM") networks, Personal Communications Service ("PCS") networks, 1× Evolution-Data Optimized ("EVDO") networks, Enhanced Data Rates for GSM Evolution ("EDGE") networks, Wi-Max networks, or Ultra Wideband networks. Other suitable networks will be or become apparent to those skilled in the art.

As shown in FIG. 4, the wireless portion of the network 202 utilizes a series of towers, such as the tower 410, and/or repeaters, to deliver a wireless signal 412 to subscriber devices. The wireless signal 412 may be encoded and multiplexed for simultaneous delivery of data and voice to many hundreds or thousands of subscribers within a particular geographic area. In particular, the wireless portion of the network 202 may be utilized to place and receive wireless telephone calls utilizing a suitable wireless subscriber device, to transmit and receive short messaging service ("SMS") messages, other types of messages, and to transmit and receive data of other types.

It should be appreciated that the subscriber devices utilized with the wireless portion of the communications network 202 may include portable wireless devices, such as the mobile telephones 406A, 406B, and 406C utilized by the subscribers 408A, 408B, and 408C, respectively, or fixed location wireless devices located in a business or dwelling, such as the residence 204B. It should also be appreciated that although the communications network 202 has been illustrated in FIG. 4 as a single network, the network 202 may comprise a combination of various separate wire line and wireless networks.

In the implementation illustrated in FIG. 4, the matching server 102 comprises a computing system that operates in conjunction with the communications network 202 to assist with the location-based delivery of information to subscriber devices connected to the network 202. As will be described in greater detail below, the matching server 102 identifies a geographic area in which an informational message, such as the messages 402A and 402B, should be transmitted to one or more subscriber devices. In one implementation, the content of the informational message is related to the geographic area in which it is transmitted. As an example, a message including neighborhood news may be transmitted only to fixed or mobile subscriber devices operating within the neighborhood. In another scenario, a message containing information regarding specials offered by proximately located businesses during an event might be transmitted to fixed or mobile subscriber devices located in the geographic area of the event.

According to one implementation, the geographic area is a statically defined fixed geographic area, such as a neighborhood, city, state, ZIP code, or school district. For example, as shown in FIG. 4, a geographic area 210A has been identified by the matching server 102 that includes one or more residences 204A and 204B, a business 205, and a school 404. In order to identify such a geographic area, the matching server 102 utilizes one or more fixed geographic indicators, such as community demarcations, fixed landmarks, government data, census data, school districts, voting districts, tax districts, ZIP code information, and other data describing the boundaries of substantially fixed geographic areas. This data may be stored in one or more databases accessible to the matching server 102, such as the database 104D. As described below, the contents of the fixed subscriber database 104A may also be utilized as fixed geographic indicators.

The boundaries of a fixed geographic area may also be determined by the matching server 102 based upon the location of one or more fixed location subscriber devices within the area. In this regard, a fixed subscriber database 104A includes detailed data identifying the geographic location of subscriber premises connected to the wire line portion of the network 202, such as the residence 204A and the business 205. Similarly, the fixed subscriber database 104A may include data identifying the location of fixed wireless devices within the area, such as a fixed location wireless subscriber device located at the residence 204B. This data may be utilized by the matching server 102, for instance, to identify the boundaries of a neighborhood in which an informational message should be transmitted. Once the geographic area has been identified, the matching server 102 transmits an informational message to subscriber devices located in the area. As an example, a message containing information regarding specials offered by the business 205 may be transmitted to subscriber devices located within the area 210A, such as those located at the residences 204A and 204B. Additional details regarding the structure of the fixed subscriber database 104A and its use will be described below with respect to FIG. 5A.

According to another implementation, the geographic area identified by the matching server 102 is an ad-hoc variably sized geographic area. Such a geographic area may be defined and relevant for a limited period of time. In order to identify such an area, the matching server 102 utilizes one or more variable geographic indicators, such as the mobile location of one or more subscriber devices, calling patterns, call volumes, or others. Data identifying the location of mobile subscriber devices is contained in a mobile subscriber database 104C. Using this data, the matching server 102 determines when a multitude of mobile subscriber devices become proximate to one another. When this occurs, the matching server 102 can identify the bounds of the ad hoc geographic area that contains the subscriber devices. For example, the matching server 102 may identify the geographic area 210B in response to determining that the subscribers 408A, 408B, and 408C have gathered at the school 404 with their subscriber devices 406A, 406B, and 406C. During the period of time that the subscribers 408A, 408B, and 408C are located at the school 404, the matching server 102 may transmit a message 402B to the subscriber devices 406A, 406B, and 406C that includes information relevant to the area, such as school-related information. During this time, the matching server 102 may also transmit a message to the subscriber devices 406A, 406B, and 406C regarding specials offered by the business 205, which is located in a proximate geographic area 210A. When the subscribers 408A, 408B, and 408C disburse from the area of the school, the geographic area 210B is no longer relevant and no further messages are transmitted to the subscriber devices 406A, 406B, and 406C regarding the school. Additional details regarding this process are provided below.

As discussed briefly above, once the matching server 102 has identified the geographic area 210A, the matching server 102 transmits a message to subscriber devices located within the identified geographic area. In this regard, the matching server 102 maintains a content database 104B that includes the informational messages that are to be transmitted. The informational messages may contain any type of content such as advertising, community news, school information, event information, traffic, weather, stock quotes, disaster information, and other types of data. The messages may be transmitted to fixed or mobile subscriber devices and may include content relevant to the geographic area in which they are transmitted. The informational messages may also be delivered using text, audio, or video. Additional details regarding the structure and contents of the content database 104B are provided below with respect to FIG. 5C.

It should be appreciated that although the matching server 102 is illustrated in FIG. 4 as a single structure, such as a single specialized computer, the matching server 102 may actually comprise a multitude of computing systems located at the same location or at different locations connected to one another by a suitable computing network. Additional details regarding the hardware and software utilized to embody the matching server 102 in one implementation are provided below with respect to FIG. 8. It should also be appreciated that although the databases 104A-104D are illustrated in FIG. 4 as being connected directly to the matching server 102, the databases 104A-104D may be located at remote network locations and may be maintained by other computing systems that are accessible to the matching server 102.

Figure 5A:
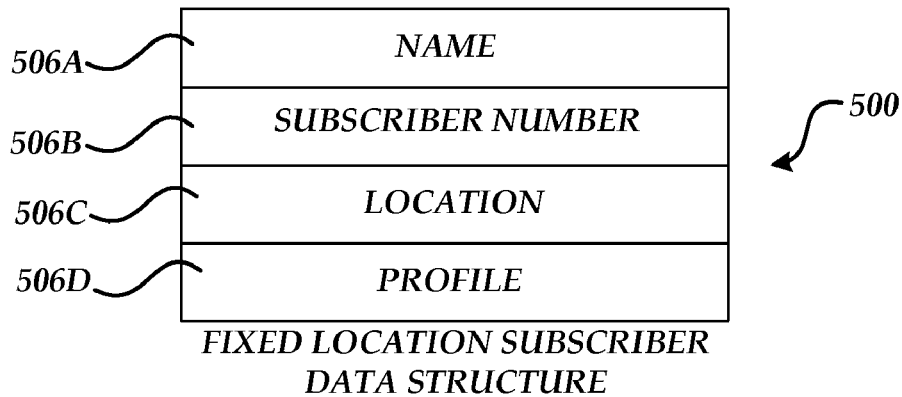
FIGS. 5A-5C are data structure diagrams illustrating the format of several data structures utilized in the embodiments described herein for storing data regarding fixed location subscriber devices, mobile location subscriber devices, and informational messages, respectively.
Figure 5B:
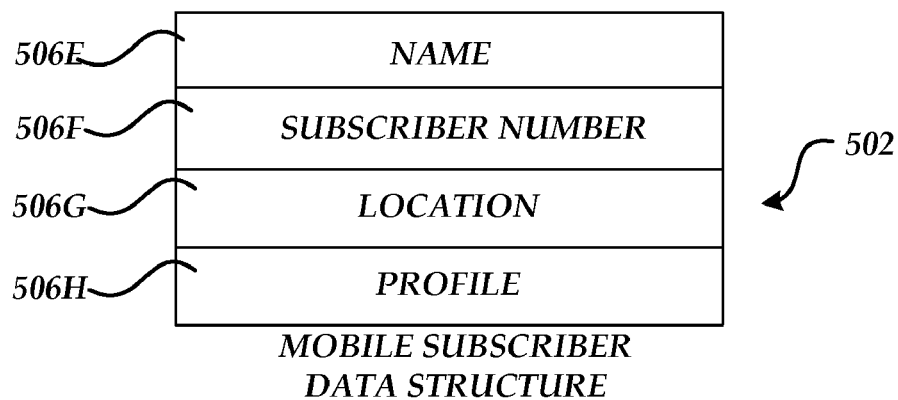
Figure 5C:
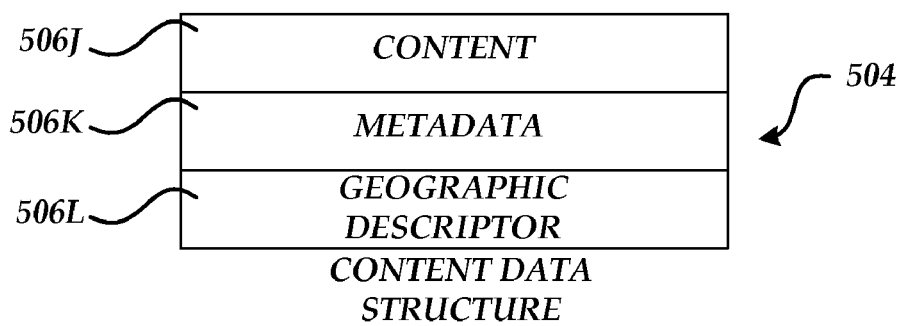

Turning now to FIGS. 5A, 5B, and 5C, additional details will be provided regarding the contents of the fixed subscriber database 104A, the mobile subscriber database 104C, and the content database 104B, respectively. In particular, FIG. 2A illustrates the format of a data record 500 that is stored in the fixed subscriber database 104A. The data record 500 includes data that identifies the fixed location of a subscriber device. Particularly, the data record 500 includes a field 506A for storing the name of the subscriber, a field 506B for storing the calling number of the subscriber device, and a field 506C for storing data describing the location of the subscriber premises at which the subscriber device is located. The field 506C may be utilized, for instance, to store information identifying the exchange or central office that supports the subscriber premises, the city, state, or zip code of the subscriber premises, or specific location information for the premises, such as its latitude and longitude or global positioning system ("GPS") coordinates. Other types of data identifying the general or specific location of the subscriber premises may also be stored in the field 506C.

As illustrated in FIG. 5A, the record 500 may further include a field 506D for storing a profile associated with the referenced subscriber device. The profile includes data that indicates the willingness of the subscriber to be contacted and one or more specific parameters for such contact. For example, the profile stored in the field 506D may include data identifying the days of the week and times that the subscriber wishes to receive information, the kind of information that the subscriber desires or does not desire, and other preferences. The matching server 102 may provide an interface through which a subscriber can utilize their subscriber device or other computing system to specify such preferences. For instance, the matching server 102 may be operative to provide a Web or wireless application protocol ("WAP") interface accessible to subscriber devices through which such preferences may be specified. As will be described in greater detail below, the matching server 102 utilizes the contents of the field 506D to determine whether a particular informational message should be transmitted to a subscriber device.

FIG. 5B illustrates the contents of a data record 502 that is stored in the mobile subscriber database 104C. Like the data record 500, the data record 502 includes a field 506E for storing a subscriber name, a field 506F for storing the subscriber calling number, a field 506G for storing the location of the subscriber device, and a field 506H for storing a subscriber profile. It should be appreciated that the contents of the field 506G may be continually or periodically updated to reflect the current location of the corresponding mobile subscriber device. This may be accomplished, for instance, by various components within the wireless portion of the network 202 capable of determining the location of the wireless subscriber devices operating therein. Appropriate triangulation or E911 technologies may be utilized within the communications network 202 for this purpose.

FIG. 5C illustrates the contents of a data record 504 that is stored in the content database 104B. As described briefly above, the content database 104B is utilized to store the content of the informational messages that are provided to the subscriber devices. The data record 504 includes a field 506J for storing the actual content of the message. The data record 504 also includes a field 506K for storing metadata associated with the message. For instance, the field 506K may be utilized to store metadata identifying the kind of message, the dates in which the message is valid, the number of subscriber devices to which the message should be provided (e.g. in the case of a limited distribution advertisement), and other types of information describing the content. The record 504 may also include a field 506L for storing a geographic descriptor identifying the bounds of the geographic area in which the message should be provided. As an example, the business 205 may indicate that an advertising message should only be provided within a limited geographic area around the business 205. The field 506L is utilized to store data identifying the geographic area and may include the latitude and longitude coordinates of the area or other similar data.

Figure 6:
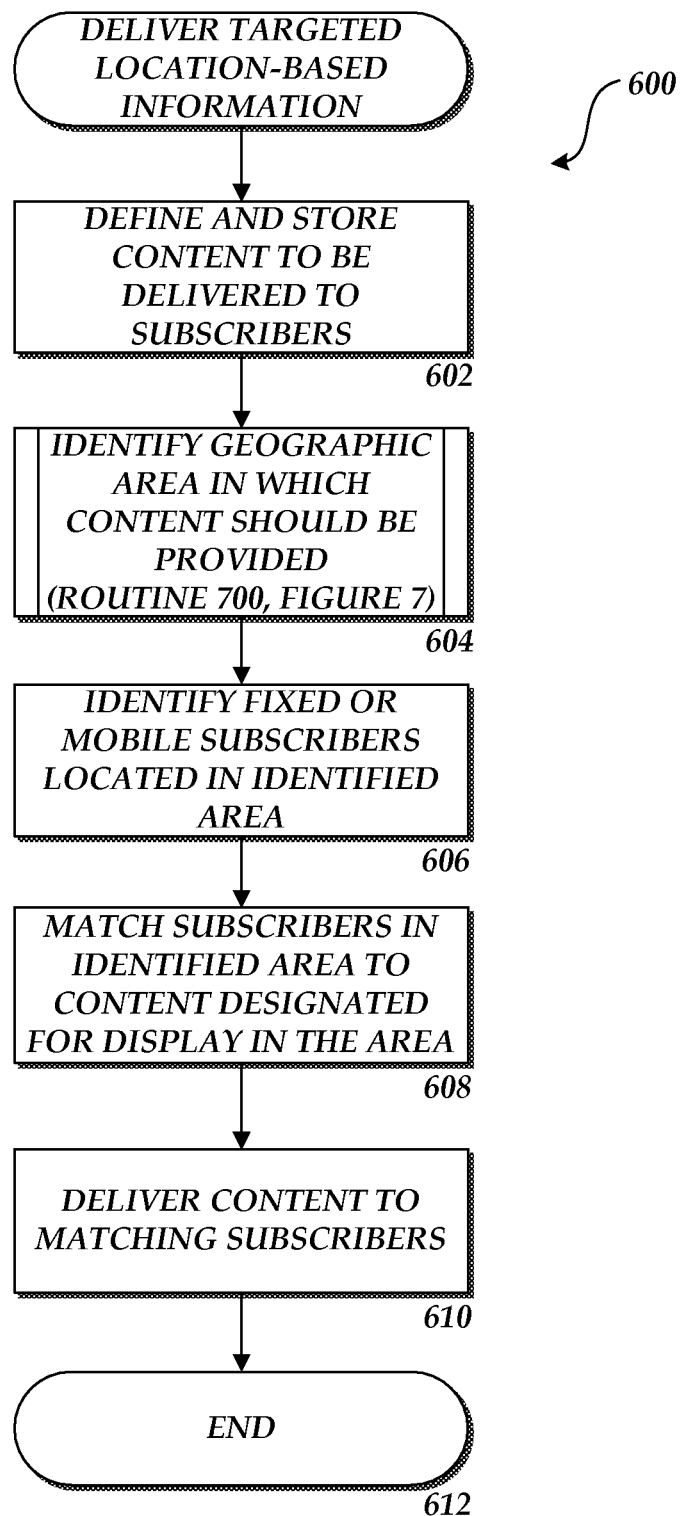
FIGS. 6 and 7 are flow diagrams showing aspects of one method described herein for providing location-based information delivery.

Referring now to FIG. 6, an illustrative routine 600 will be described for providing targeted location-based information. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 600 begins at operation 602, where the matching server 102 receives and stores the content of the informational messages to be delivered. As discussed above, the matching server 102 stores the messages in the content database 104B. According to one implementation, the matching server 102 may provide a user interface through which the content may be defined and stored in the database 104B. For instance, through an interface provided by the matching server 102, a business owner could specify an advertising message that should be delivered, the geographical area in which the message should be delivered, and other parameters regarding the delivery of the message. The matching server 102 would then save the provided information in the database 104B.

Figure 7:
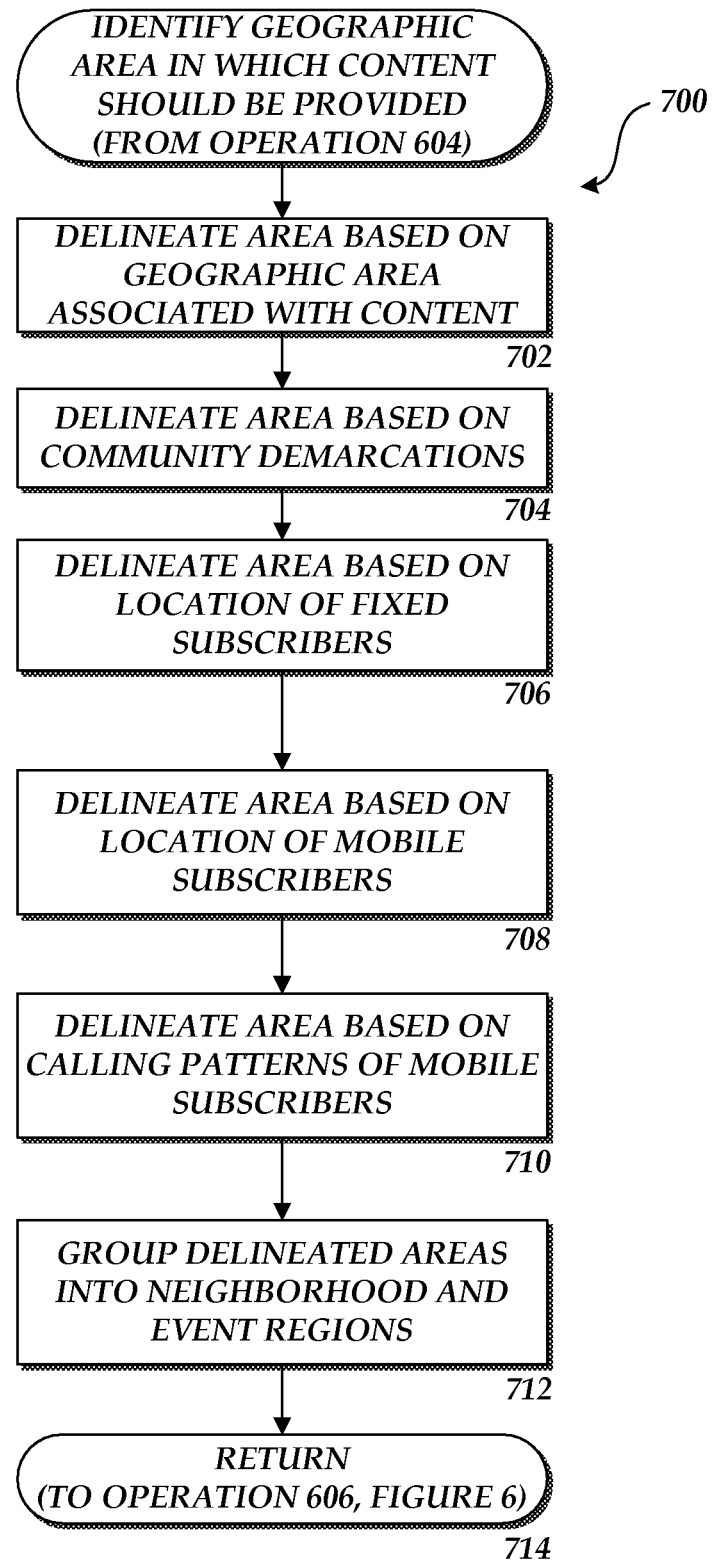

Once the content has been defined and stored by the matching server 102 in the database 104B, the routine 600 continues from operation 602 to operation 604. At operation 604, the matching server 102 identifies the geographic area in which the content should be provided. This may include, for instance, determining a time period in which the identified geographic area is relevant. For instance, a geographic area including a large number of wireless subscribers may be identified, such as during an event. The event may have a limited duration during which the geographic area is relevant for the transmission of messages. FIG. 7, described below, shows an illustrative routine 700 performed by the matching server 102 to identify the appropriate geographic area and the relevant duration for the area. Once the matching server 102 has identified the geographic area in which a message should be provided, the routine 600 continues from operation 604 to operation 606.

At operation 606, the matching server 102 identifies the fixed or mobile subscriber devices that are located in the identified geographic area in which the message is to be delivered. This may be accomplished, for instance, by comparing the location information of the fixed and mobile subscriber devices contained in the databases 104A and 104C, respectively, to the boundaries of the geographic area. Subscriber devices within the geographic area are considered to be potential subscriber devices to which the message may be transmitted. Even though a subscriber device may be located within the identified geographic area, the message may not be transmitted to a subscriber device as a result of data stored in the corresponding subscriber profile. This is described in greater detail below.

From operation 606, the routine 600 continues to operation 608. At operation 608, the matching server 102 matches subscriber devices in the geographic area to content designated for display in the area. This may be performed, for instance, by examining the subscriber profile stored in either the database 104A or 104C to locate subscriber preferences regarding the delivery of informational messages. If the profile indicates that the user would like to receive the message, the subscriber device is identified as an actual device to which the message will be transmitted. Otherwise, the subscriber device is identified as a device to which the message should not be sent. Once the matching process has been completed, the routine 600 continues from operation 608 to operation 610.

At operation 610, the matching server 102 transmits the informational message to the subscriber devices identified as actual recipients of the message. The matching server 102 may transmit the message to the identified devices using SMS, push or pull e-mail, or other similar messaging techniques. In one embodiment, the matching server 102 provides an interface through which the subscriber device can retrieve the message from the matching server 102. For instance, the matching server 102 may provide a world-wide-web ("Web") or wireless application protocol ("WAP") site through which a subscriber device may retrieve the informational message. Once the matching server 102 has transmitted the message to the appropriate subscriber devices, the routine 600 continues to operation 612, where it ends.

It should be appreciated that the routine 600 illustrated in FIG. 6 may be repeated periodically or continually by the matching server 102 to monitor the location of subscriber devices, to update the fixed and variable geographic areas in which messages may be provided, and to identify updates to the content database 104B and the subscriber profiles. In this manner, the matching server 102 provides appropriate targeted informational messages to subscriber devices at the most appropriate time in view of the message content and the subscriber profile.

Referring now to FIG. 7, additional details will be provided regarding the processing operations performed by the matching server 102 in order to identify the geographic area in which an informational message should be transmitted. In particular, the routine 700 begins at operation 702, where the matching server 102 begins delineating the boundaries of the geographic area in which the message should be provided using the geographic descriptors associated with the message. As discussed above, the geographical descriptors are stored in the field 506L of the record 504 of the content database 104B.

If no geographic descriptors are provided in the record 504, the matching server 102 may utilize other sources to delineate the boundaries of the geographic area in which the message should be provided. In one embodiment, even where geographic descriptors are provided with the message, the matching server 102 may utilize other sources to expand or limit the specified geographic area to a particular region. In this manner, the matching server 102 chooses the most appropriate geographic area for the delivery of each message stored in the content database 104B. Additional details regarding this process are discussed below.

From operation 702, the routine 700 continues to operation 704 where a first fixed geographic descriptor is utilized by the matching server 102 to identify the boundaries of the geographic area. In particular, one or more community demarcations, such as fixed landmarks, government data, census data, school districts, voting districts, tax districts, ZIP code information, or other data describing the boundaries of substantially fixed geographic area is utilized to determine the geographic area in which the message should be transmitted.

From operation 704, the routine 700 continues to operation 706, where a second fixed geographic descriptor is utilized by the matching server 102 to further identify the boundaries of the geographic area. In particular, at operation 706, the matching server 102 utilizes the location of fixed subscriber devices in the region as specified by the record 500 in the fixed subscriber database 104A. It should be appreciated that other fixed geographic descriptors may also be utilized by the matching server 102 to further delineate the boundaries of the geographic area.

From operation 706, the routine 700 continues to operation 708, where the matching server 102 begins utilizing variable geographic indicators to further delineate the boundaries of the geographic region. In particular, at operation 708, the matching server 102 utilizes the current location of mobile subscriber units as defined in the mobile subscriber database 104C to further define the geographic area. As discussed above, the matching server 102 may utilize the contents of the database 104C to identify a grouping of subscriber units and, by inference, an event or "happening." The boundaries of the event may then be utilized to further define the geographic area in which the message should be transmitted. Similarly, at operation 710 the matching server 102 may utilize the calling patterns of mobile subscriber devices to make additional inferences about the boundaries of the geographic area. These inferences are utilized by the matching server 102 to adjust the boundaries of the geographic area in which the message is to be transmitted.

From operation 710, the routine 700 continues to operation 712 where the matching server 102 groups the delineated areas into various neighborhood and event regions. The neighborhood and event regions may be combined appropriately to form the geographic area in which the message is to be transmitted. It should be appreciated that any combination of the fixed and variable geographic indicators described above with respect to FIG. 6, and others, may be utilized by the matching server 102 to determine the appropriate geographic area for transmission of a message. From operation 712, the routine 700 continues to operation 714, where it returns to operation 606, described above with respect to FIG. 6.

It should be appreciated that, according to implementations, the matching server 102 may have access to call history data for the various subscriber devices. In these implementations, the matching server 102 identifies calling patterns from the call history data. Such calling patterns may include identifying patterns regarding the frequency of calls, the time of calls, and the location from which calls where made. From the identified patterns, the matching server 102 identifies content that should be provided to particular subscriber devices at various times of day. For instance, the matching server 102 may be able to determine that a subscriber device was utilized to place a call from a coffee shop each morning. Based upon this information, the matching server 102 may identify an informational message relating to a coffee shop (an advertisement, for instance) and to cause the message to be transmitted to the subscriber device at an appropriate time.

The matching server 102 may further identify the dates and frequency of events from the patterns of calling data. For instance, the matching server 102 may be able to identify that each year on a particular date, several thousand people show up for a parade, concert, or other type of event. Based upon the identification of such a pattern, the matching server 102 may transmit an appropriate informational message to the subscriber devices at that location on the same date during the next year. The message could be customized to the particular event or happening.

It should also be appreciated that some or all of the functionality described herein as being performed by the matching server 102 may be performed by a subscriber device. For instance, a subscriber device may be programmed to monitor call history, location, and other information and to request appropriate messages for display to the subscriber. In this manner, the processing requirements for the functionality described herein may be spread among a large number of devices on the edge of the network 202 rather than being performed at a single computing device or location. The subscriber devices may also utilize peer-to-peer technologies to deliver geographically relevant messages to other subscriber devices directly without the need for a matching server 102. According to other implementations, the subscriber devices may also include functionality for determining their own location, altitude, and orientation, and for providing this information to the matching server 102. This may be accomplished, for instance, through the use of appropriate GPS, altitude, and position sensors in the devices. In this regard, the subscriber devices may also utilize a communications protocol specifically configured for the transmission of such data to the matching server 102 or other computer system.

Figure 8:
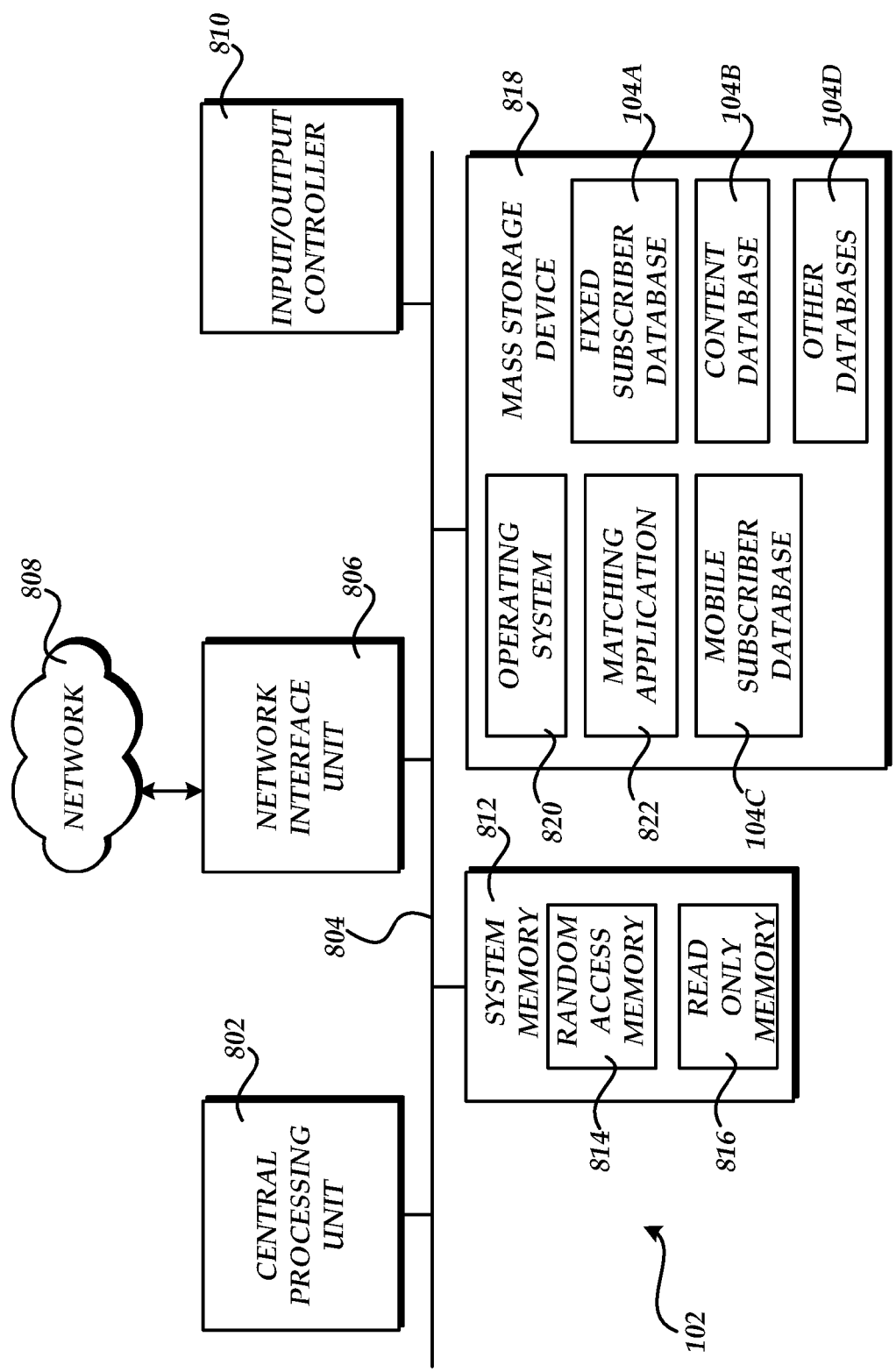
FIG. 8 is an architecture diagram illustrating aspects of the hardware and software utilized by a system described herein configured to provide location-based information delivery in one implementation.

Referring now to FIG. 8, an illustrative computer architecture for the matching server 102 utilized in the various embodiments presented herein will be discussed. FIG. 8 illustrates the architecture of a conventional server computer, and may be utilized to embody the matching server 102, described above. It should be appreciated, however, that in various embodiments the matching server 102 may actually comprise a multitude of computing systems located at the same location or at different locations connected to one another by a suitable computing network. The computer architecture shown in FIG. 5 should therefore be considered illustrative.

The computer architecture shown in FIG. 8 includes a central processing unit 802 ("CPU"), a system memory 812, including a random access memory 814 ("RAM") and a read-only memory ("ROM") 816, and a system bus 804 that couples the memory to the CPU 802. A basic input/output system containing the basic routines that help to transfer information between elements within the matching server 102, such as during startup, is stored in the ROM 816. The matching server 102 further includes a mass storage device 818 for storing an operating system 820, application programs, and other program modules and data.

The mass storage device 818 is connected to the CPU 802 through a mass storage controller (not shown) connected to the bus 804. The mass storage device 818 and its associated computer-readable media provide non-volatile storage for the matching server 102. Although the description of computer-readable media contained herein refers to a mass storage device, such as a hard disk or CD-ROM drive, it should be appreciated by those skilled in the art that computer-readable media can be any available media that can be accessed by the matching server 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, nano memory, magnetic disk storage or other magnetic storage devices, or any other medium which can be used to store the desired information and which can be accessed by the matching server 102.

According to various embodiments, the matching server 102 may operate in a networked environment using logical connections to remote computers through a network 808, such as the Internet. The network 808 includes the communications network 202. The matching server 102 may connect to the network 202 through a network interface unit 806 connected to the bus 804. It should be appreciated that the network interface unit 806 may also be utilized to connect to other types of networks and remote computer systems. The matching server 102 may also include an input/output controller 810 for receiving and processing input from a number of other devices, including a keyboard, mouse, or electronic stylus. Similarly, an input/output controller may provide output to a display screen, a printer, or other type of output device.

As mentioned briefly above, a number of program modules and data files may be stored in the mass storage device 818 and RAM 814 of the matching server 102, including an operating system 820 suitable for controlling the operation of a networked server computer, such as the UNIX operating system. The mass storage device 818 and RAM 814 may also store one or more program modules. In particular, the mass storage device 818 and the RAM 814 may store a matching application program 822 that performs some or all of the functionality described above with respect to FIGS. 1, 2, 6 and 7. The mass storage device 818 may also be utilized to store the mobile subscriber database 104C, the fixed subscriber database 104A, the content database 104B, and other databases 104D. As mentioned above, these databases may also be stored at other networked computing systems that are accessible to the matching server 102.

Based on the foregoing, it should be appreciated that an apparatus and method are provided herein for location-based information delivery. Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for location-based information delivery, the method comprising:
    receiving media content for insertion into a media stream, the media content including a geographic descriptor specifying that the media content should be provided to one or more subscriber devices within an ad-hoc variably sized geographic area;
    receiving, from each of the subscriber devices, geographic location information corresponding to the each of the subscriber devices;
    determining whether each of the subscriber devices is proximate to others of the subscriber devices;
    in response to determining that each of the subscriber devices is proximate to others of the subscriber devices, determining geographic bounds of the ad-hoc variably sized geographic area-associated with the media content, wherein the geographic bounds of the ad-hoc variably sized geographic area are defined by the geographic location information corresponding to the subscriber devices;
    identifying one or more subscriber devices to which the media content may be potentially delivered within the ad-hoc variably sized geographic area based on one or more community demarcations and further based upon calling patterns of the subscriber devices;
    identifying the actual subscriber devices to which the media content should be delivered from the identified potential subscriber devices based on the ad-hoc variably sized geographic area associated with the media content; and
    causing the media content to be delivered to the identified actual subscriber devices.

2. The method of claim 1, wherein the media stream comprises a video stream and wherein the media content comprises video content relating to the geographic area identified in the geographic descriptor.

3. The method of claim 1, wherein the subscriber device is a fixed location subscriber device.

4. The method of claim 1, wherein the geographic location information corresponding to each of the subscriber devices comprises information pertaining to one or more community demarcations.

5. The method of claim 2, wherein the video content comprises a video advertisement relating to a business located within the geographic area identified in the geographic descriptor.

6. The method of claim 3, wherein causing the media stream to be delivered to the fixed location subscriber device comprises transmitting the media stream to the subscriber device over a wired or wireless communications network.

7. The method of claim 6, wherein each of the subscriber devices comprises a video display device operative to receive the media stream over the wired or wireless communications network and to render the media stream.

8. A method for location-based information delivery, the method comprising:
    receiving an informational message;
    receiving a geographic descriptor specifying that the informational message should be delivered to one or more subscriber devices within an ad-hoc variably sized geographic area;
    receiving, from each of the subscriber devices, geographic location information corresponding to the each of the subscriber devices;
    determining whether each of the subscriber devices is proximate to the others of the subscriber devices;
    in response to determining that each of the subscriber devices is proximate to others of the subscriber devices, determining geographic bounds of the ad-hoc variably sized geographic area in which the message should be delivered, wherein the geographic bounds of the ad-hoc variably sized geographic area are defined by the geographic location information corresponding to the subscriber devices;
    identifying one or more subscriber devices to which the message may be potentially delivered within the geographic area based on one or more community demarcations and further based upon calling patterns of the subscriber devices;
    identifying the actual subscriber devices to which the message should be delivered from the identified potential subscriber devices based on the ad-hoc variably sized geographic area associated with the message; and
    causing the message to be delivered to the identified actual subscriber devices.

9. The method of claim 8, wherein identifying the geographic area in which the message should be delivered further comprises identifying the geographic area based upon a fixed location of one or more subscriber devices.

10. The method of claim 8, wherein receiving the informational message comprises receiving information related to the geographic area.

11. The method of claim 8, wherein identifying a geographic area in which the message should be delivered comprises identifying the geographic area based upon a defined geographical area corresponding to the informational message.

12. The method of claim 8, wherein identifying the geographic area in which the message should be delivered further comprises identifying the geographic area based on a mobile location of one or more subscriber devices.

13. The method of claim 8, wherein identifying one or more subscriber devices to which the message may be potentially delivered within the geographic area comprises identifying the subscriber devices located within the geographic area having a fixed location or a mobile location as devices to which the message may be potentially delivered.

14. The method of claim 8, wherein identifying the actual subscriber devices to which the message should be delivered further comprises determining whether each potential subscriber device to which the message may be delivered is within the geographic area.

15. The method of claim 8, wherein causing the message to be delivered to the identified actual subscriber devices comprises transmitting the informational message to the actual subscriber devices over a wired or wireless communications network.

16. The method of claim 8, wherein causing the message to be delivered to the identified actual subscriber devices comprises providing an interface through which the subscriber devices may request the message, receiving a request at the interface for the message, and providing the message in response to the request.

17. A computer-readable medium having computer executable instructions stored thereon which, when executed by a computer, cause the computer to:
store a first data record comprising an informational message;
store a second data record comprising data identifying a fixed location of a subscriber device to which the message may be potentially transmitted;
store a third data record comprising data identifying a mobile location of a subscriber device to which the message may be potentially transmitted;
store a geographic descriptor specifying that the informational message is to be delivered to one or more subscriber devices within an ad-hoc variably sized geographic area;
receive, from each of the subscriber devices, geographic location information corresponding to the each of the subscriber devices;
determine whether each of the subscriber devices is proximate to others of the subscriber devices;
in response to determining that each of the subscriber devices is proximate to others of the subscriber devices, determine geographic bounds of the ad-hoc variably sized geographic area in which the message should be delivered, wherein the geographic bounds of the ad-hoc variably sized geographic area are defined by the geographic location information corresponding to the subscriber devices;
identify subscriber devices to which the message may potentially be transmitted that are located within the ad-hoc variably sized geographic area based on the contents of the second data record and the third data record;
identify the actual subscriber devices to which the message should be transmitted based upon a profile associated with the actual subscriber devices, calling patterns of the potential subscriber devices and on one or more community demarcations; and to transmit the message to the identified actual subscriber devices.

18. The computer-readable medium of claim 17, wherein the first data record further comprises a geographic descriptor corresponding to the message, the geographic descriptor specifying the ad-hoc variably sized geographic area in which the message may be provided.

19. The computer-readable medium of claim 17, wherein the computer executable instructions are further operative when executed to cause the computer to identify the geographic area based upon a fixed location of one or more subscriber devices.

20. The computer-readable medium of claim 17, wherein the computer executable instructions are further operative when executed to cause the computer to identify the geographic area based on a mobile location of one or more subscriber devices.

21. A system for location-based information delivery including a matching server, the matching server configured to:
receive an informational message;
receive a geographic descriptor specifying that the informational message should be delivered to one or more subscriber devices within an ad-hoc variably sized geographic area;
receive, from each of the subscriber devices, geographic location information corresponding to the each of the subscriber devices;
determine whether each of the subscriber devices is proximate to others of the subscriber devices;
in response to determining that each of the subscriber devices is proximate to others of the subscriber devices, determine geographic bounds of the ad-hoc variably sized geographic area-associated with the informational message, wherein the geographic bounds of the ad-hoc variably sized geographic area are defined by the geographic location information corresponding to the subscriber devices;
identify one or more subscriber devices to which the informational message may be potentially delivered within the geographic area based on calling patterns of one or more subscriber devices;
identify the actual subscriber devices to which the informational message should be delivered from the identified potential subscriber devices based on one or more community demarcations; and
cause the informational message to be delivered to the identified actual subscriber devices.

22. The system of claim 21, wherein the geographic location information comprises the mobile location of one or more subscriber devices and the calling patterns of one or more subscriber devices.

23. The system of claim 21, wherein the geographic area is based on community demarcations and the location of one or more fixed location subscriber devices.

* * * * *